United States Patent [19]
Krüger et al.

[11] Patent Number: 4,811,985
[45] Date of Patent: Mar. 14, 1989

[54] AUTOMOBILE ROOF HAVING A LID ASSOCIATED WITH A ROOF OPENING

[75] Inventors: Peter Krüger; Dieter Federmann, both of Hanau, Fed. Rep. of Germany

[73] Assignee: Rockwell-Golde G.m.b.H., Fed. Rep. of Germany

[21] Appl. No.: 160,750

[22] Filed: Feb. 18, 1988

[30] Foreign Application Priority Data

Feb. 26, 1987 [DE] Fed. Rep. of Germany ....... 3706141

[51] Int. Cl.⁴ .................... B60J 7/053; B60J 7/057
[52] U.S. Cl. ............................ 296/214; 296/216; 296/222; 296/223
[58] Field of Search ........ 296/211, 214, 216, 220–223; 49/62, 63

[56] References Cited

U.S. PATENT DOCUMENTS

| 2,985,483 | 5/1961 | Bishop et al. | 296/223 |
| 3,086,810 | 4/1963 | Yuen | 49/63 X |
| 4,257,646 | 3/1981 | Schatzler | 296/222 |
| 4,331,359 | 5/1982 | Sheldon | 49/63 X |
| 4,468,062 | 8/1984 | Marcus et al. | 296/97 G |
| 4,650,244 | 3/1987 | Boots | 296/214 X |
| 4,671,564 | 6/1987 | Sumida et al. | 296/221 X |
| 4,671,565 | 6/1987 | Grimm et al. | 296/216 |

FOREIGN PATENT DOCUMENTS

| 3248413 | 7/1983 | Fed. Rep. of Germany | 296/211 |
| 3427772 | 2/1986 | Fed. Rep. of Germany | 296/211 |
| 60-4420 | 1/1985 | Japan | 296/211 |
| 1411305 | 10/1975 | United Kingdom | 296/222 |

Primary Examiner—Dennis H. Pedder

[57] ABSTRACT

In an automobile roof constructed, for example, as a sliding-lifting roof, and having a rigid lid, a sliding liner displaceable on lateral guide rails is provided, which is displaceable by motor operation or by hand by actuating elements connected only with it, independently of the setting of the rigid lid, and which possesses no entraining coupling with the lid.

2 Claims, 5 Drawing Sheets

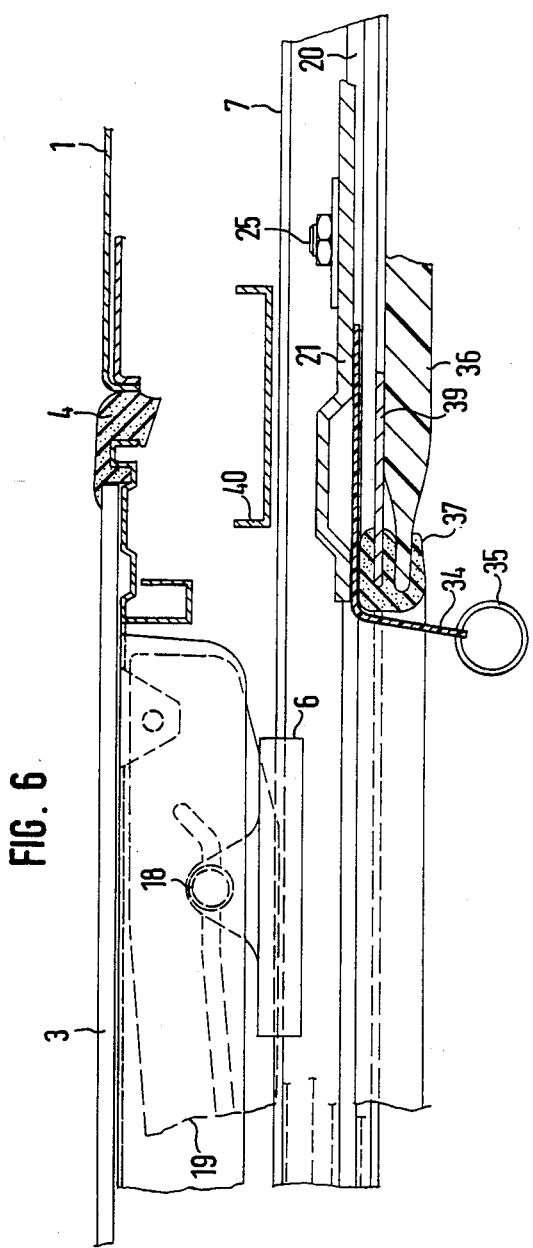

AUTOMOBILE ROOF HAVING A LID ASSOCIATED WITH A ROOF OPENING

FIELD OF THE INVENTION

This invention relates to an automobile roof having a lid associated with a roof opening.

BACKGROUND OF THE INVENTION

More particularly, the invention relates to a roof having a rigid lid which, in its closed position, closes a roof opening, out of which it is at least partially displaceable, and comprising a sliding liner which is displaceable beneath a rear, fixed portion of the roof. The sliding liner in its closed position closes an opening formed in a fixed vehicle roof liner beneath the roof opening, and a front edge of which liner, at its maximum opening displacement, lies behind the rear edge of the roof opening.

This type of automobile roof is intended to include sliding roofs, sliding-lifting roofs, lifting flaps and ridge sliding roofs (known as spoiler roofs). The rigid lid is, for the purposes of the present invention, preferably a translucent or transparent glass lid, but it may also be constructed as a sheet metal lid.

DESCRIPTION OF THE PRIOR ART

For roof constructions of this type, sliding liners have long been known. Especially in the case of automobile roofs having a glass lid, it is desirable when the glass lid is closed, to shield against solar radiation by the sliding liner. But even when the rigid lid is entirely or partly open, the sliding liner may be used either for completely exposing the roof opening or for covering this opening partly to completely. Where the roof opening is completely exposed by the sliding liner, it is desirable for the forward edge of the latter to be located completely behind the rear edge of the opening in the fixed automobile roof liner, so that the sliding liner shall not penetrate into the opening, which usually has smaller dimensions than the roof opening, and thereby reduce its maximum open area. This is not, however, achieved in all roof constructions.

In one known sliding roof with a lining lid (DE-GM No. 17 64 195) the lining lid cover i.e. the sliding liner, is movable independently of the sliding lid, but is coupled with the latter for the opening movement. This is advantageous, because the sliding liner, when the roof is opened, is automatically entrained into its rearward position, but otherwise remains open for entry of light independently of the opened or closed position of the sliding lid. If the sliding liner is to be opened when the sliding lid is closed, it must be displaced by hand into its open position. A gripping recess at the forward edge of the sliding liner is used here as a hand-operating device. In order, however, to enable this gripping recess again to be gripped when the sliding liner is completely slid back when the sliding lid is closed, the forward edge of the sliding liner must project with its gripping recess before the front edge of the opening in the fixed vehicle roof liner. Thus a maximum opening area cannot be achieved. A disadvantage of this construction is also that, when the sliding lid is open, the sliding liner cannot be slid forwards in order to cover the opened roof opening, because the coupling means acting between sliding lid and sliding liner in the opening displacement do not permit this.

In another known sliding roof (DE-PS No. 29 23 904), a sliding liner is coupled with a sliding lid in such a manner that, in the completely opened position of the sliding lid, the front edge of the sliding liner lies behind the rear edge of the opening in a fixed vehicle roof liner. For the closure movement of the sliding liner starting from this position, a restoring assembly is provided, by means of which the sliding liner, as the sliding lid closes, can be automatically entrained into an intermediate position, in which the sliding liner projects with its gripping recess, located in the forward region of the sliding liner, into the opening. By this construction, the result is indeed achieved that the sliding liner, when the sliding lid is fully opened, disappears beneath the fixed vehicle roof liner, but when the sliding lid is fully opened, on account of the engagement of an entraining assembly which causes the common opening displacement of sliding lid and sliding liner, the sliding liner cannot be displaced forwards for partly or completely covering the roof opening or liner opening. Thus, in the maximum ventilating position of the sliding lid, i.e. in its fully opened displacement, the possibility does not exist of shielding against solar radiation by means of the sliding liner. If, in this known sliding roof, starting from a fully opened position of the sliding lid and thus also of the sliding liner, the sliding lid and sliding liner are to be brought into an intermediate position, in which the roof opening and the opening in the fixed liner are only partly opened, then the disadvantage exists that the sliding lid must first be fully closed in order that the sliding liner shall be accessible for hand engagement. Thereafter, the sliding lid must then be slid back into the desired open position. In no case, however, can the sliding liner be displaced in the direction of closure beyond the front edge of the sliding lid.

In a further known sliding roof (DE-OS No. 33 38 372), a second entraining assembly, capable of being uncoupled, is provided between sliding lid and sliding liner, which in the coupled condition, during closure of the sliding lid, automatically entrains the sliding liner into its closed position. A closing displacement of the sliding liner by hand is thereby indeed rendered unnecessary, if the second entraining assembly is coupled, but with this sliding roof construction also the possibility does not exist, with the lid fully opened, of displacing the sliding liner forwards for partly or completely covering the roof opening or the opening in the fixed roof liner.

OBJECT OF THE INVENTION

It is therefore an object of the present invention to provide an automobile roof in which the sliding liner, even when the sliding lid is open, can be displaced into its closure direction for completely or partly covering the roof opening or the liner opening.

SUMMARY OF THE INVENTION

According to the present invention, there is provided an automobile roof having a rigid lid which, in its closed position, closes a roof opening, out of which it can be at least partly displaced, and comprising a sliding liner which is displaceable beneath a rear, fixed portion of the roof, closes, when in its closed position, an opening formed in a fixed vehicle roof liner beneath the roof opening, and the front edge of which, in the maximum opened displacement, lies beneath a rear edge of the opening of the fixed vehicle roof liner, and the sliding liner being displaceable by actuating elements connected only with it, independently of the rigid lid.

Thus, the entraining coupling between rigid lid and sliding liner, present in all the known, above-described sliding roofs, is avoided. In every position of the sliding lid, therefore, the sliding liner can be displaced into any desired position, without the sliding lid needing to be moved for this purpose. This includes, of course, also a complete or partial closure displacement of the sliding liner when the rigid lid is fully or partly open.

Preferably, the sliding liner is connected with movement transmission elements of a stationarily mounted drive apparatus. By these means the driver can actuate the sliding liner without having to handle it directly. The operation of the drive apparatus can be carried out from a position of the vehicle in the immediate vicinity of the driver, so that the latter is not distracted from the traffic on the road in order to displace the sliding liner, as was the case hitherto in some known sliding roofs, in which the driver had to search with one hand for the handle on the sliding liner and then to displace the sliding liner with outstretched arm by overcoming a possible difficult resistance to movement.

Preferably, the drive apparatus comprises an electric motor which can be operated in both directions of rotation, a pinion of which engages force-transmittingly into the movement transmission elements. The use of an electric motor facilitates a stepless adjustment of the sliding liner by means of a switch, which can be mounted within the immediate reach of the driver on the dashboard or on a bracket situated in front of the two front seats. The sliding liner is advantageously guided on lateral guide rails and connected, in the region of the guide rails, with the movement transmission elements. The movement transmission elements are not visible either from the interior or from the exterior of the vehicle.

With advantage, the guide rails each comprise a laterally open guide channel, into which the sliding liner engages by at least two sliding pieces, of which a rear piece is firmly connected with a drive cable guided in compression-stiff manner in the guide channel, which cable is in engagement with the pinion of the electric motor. The drive of the sliding liner is thus provided by drive cables used as movement transmission elements, which have proved highly satisfactory for actuating movement functions in automobile body construction for many years.

The sliding pieces are with advantage connected with the sliding liner adjustably in the direction of sliding of the sliding liner. This arrangement permits, in a simple manner, the setting of the sliding liner relative to the opening in the fixed roof liner and relative to the position of the sliding pieces in the guide channels.

One especially favourable arrangement of the guide rails for the sliding liner is obtained if the guide rails are constructed in one piece with lateral guide rails provided for the rigid lid.

The electric motor constituting the drive apparatus is preferably mounted behind the completely slid-open sliding liner, where sufficient space is available to accommodate it, especially since modern geared motors used in automobile construction are extremely flat.

A drive apparatus equipped with an electric motor does indeed constitute the preferred embodiment but the invention can also be realised without the use of a motor. For this purpose it is advantageous if the sliding liner is guided on lateral guide rails and is connected, at its front edge, with a preferably flexible, hand-operated device which, even at the maximum opened displacement, extends into the opening of the fixed roof liner. This flexible hand-operating device, for example a pulling band or the like, can be inconspicuously fitted and does not reduce the full opening size of the opening provided in the fixed vehicle roof liner.

BRIEF DESCRIPTION OF THE DRAWINGS

For a better understanding of the invention, and to show how the same may be carried into effect, reference will now be made, by way of example, to the accompanying drawings, in which:

FIG. 6 is a longitudinal section through part of the rear region of an automobile roof in accordance with an alternative embodiment.

DETAILED DESCRIPTION OF THE PREFERRED EMBODIMENTS

Figure 1:
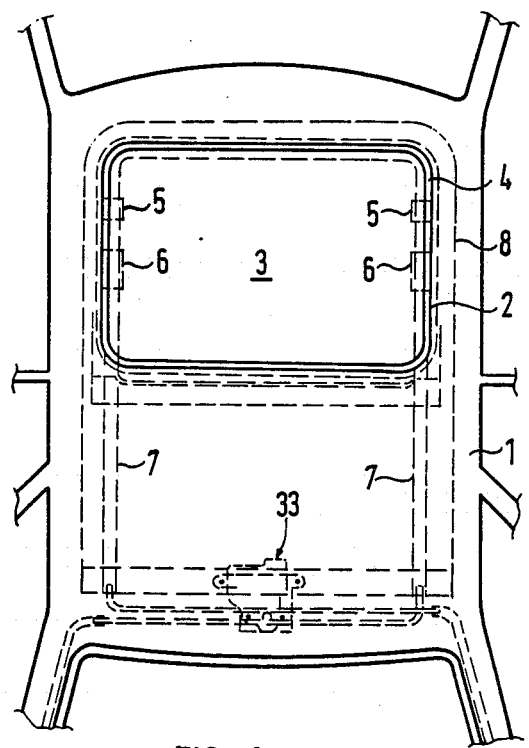
FIG. 1 is a plan view of a partly cut away automobile roof.

From FIG. 1, the fixed roof portion 1 of a passenger automobile can be seen, in the forward region of which a rectangular roof opening, rounded at the corners, is situated which is bounded by an opening edge 2. In FIG. 1, the roof opening is closed by a rigid lid 3 of glass, which is sealed with respect to the fixed roof part 1 by an edge gap seal 4 of elastomeric material, extending around and fixed to it and bridging the gap between the outer periphery of the lid 3 and the opening edge 2. The example shown of an automobile roof relates to a sliding-lifting roof, i.e. the rigid lid 3 is slidably guided by front sliding elements 5 and rear sliding elements 6, disposed in pairs, on guide rails 7 of a guide frame 8 mounted on either side of the roof opening, so that the lid can either by displaced beneath the rear fixed roof part 1, after its rear edge has been lowered, or, also starting from the closed position shown in FIG. 1, can be opened by raising its rear edge and pivoting about a pivot axis orientated transversely to the direction of travel near its front edge, in the manner of a ventilating flap. The pivot axis is defined by pivot pins 9 (FIG. 3), mounted on the front sliding elements 5.

Figure 2:
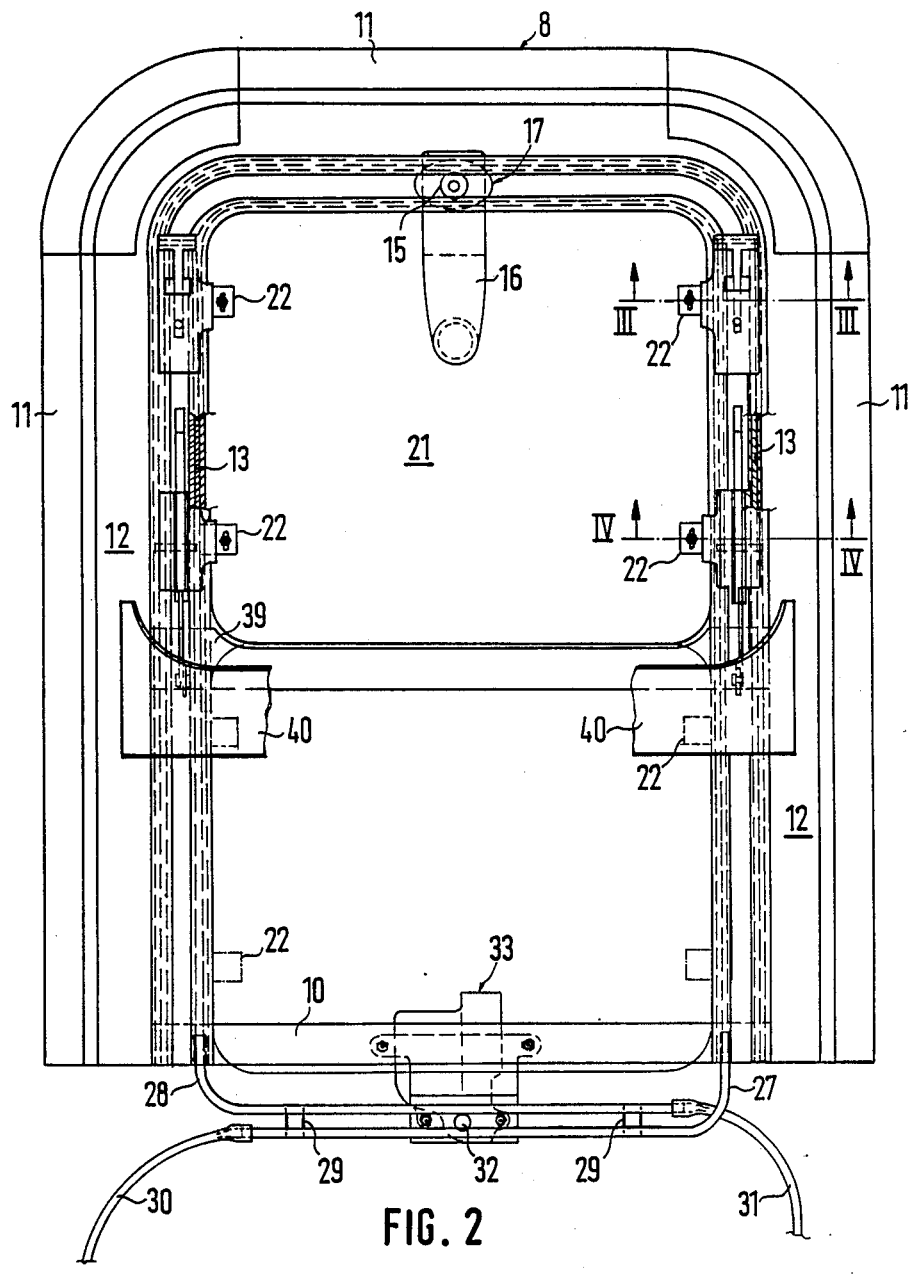
FIG. 2 is a plan of a sliding roof guide frame showing the components fitted or guided thereon, but without the rigid lid.

As FIG. 2 shows, the single-piece guide frame 8 has a generally U-shaped plan. The two lateral arms of the guide frame 8 are connected together at their rear ends by a transverse member 10. The guide frame 8 is so shaped in cross-section (FIGS. 3, 4) that it possesses, at front and sides, a continuous, outwardly projecting flange 11, by means of which it is fixed to the fixed roof portion 1. Adjoining the flange 11 on the inside, the guide frame 8 constitutes an upwardly open water channel drainage 12, which is bounded on the inside by the guide rail 7, formed in one piece with it.

Figure 3:
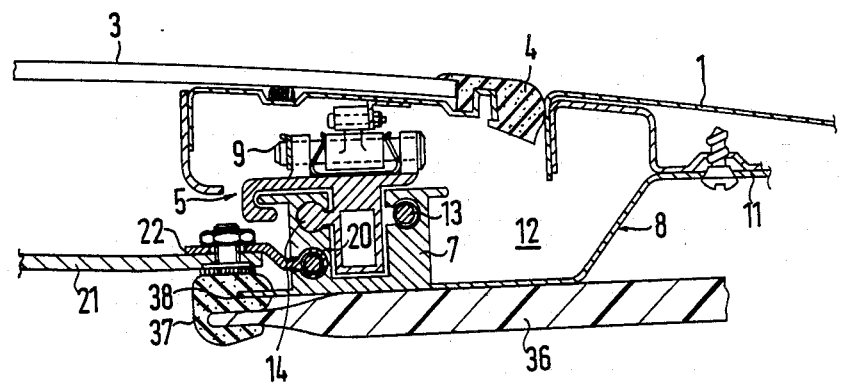
FIG. 3 is a section taken along the line III—III in FIG. 2, but showing part of the rigid lid and part of the automobile roof.
Figure 4:
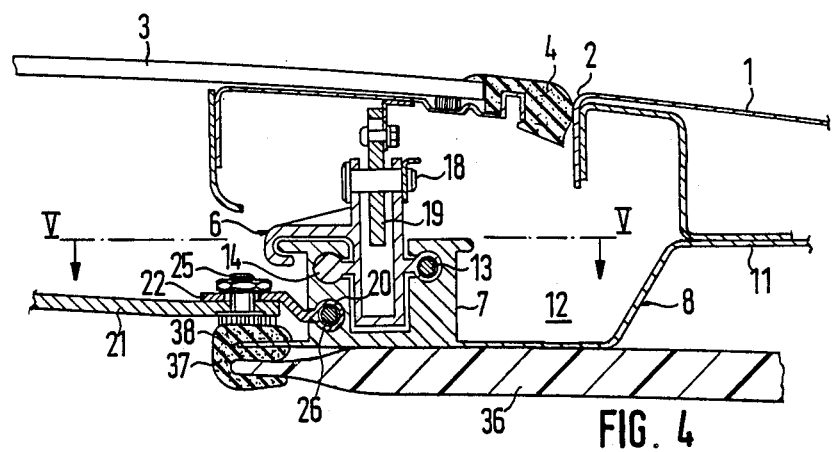
FIG. 4 is a section taken along the line IV—IV in FIG. 2 similar to the section according to FIG. 3.
Figure 5:
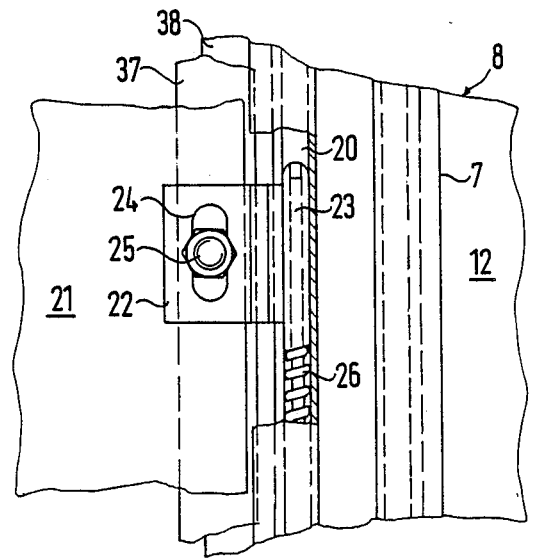
FIG. 5 is a view, partly cut away, of the components shown in FIG. 4 along the line V—V.

The front and rear sliding elements 5, 6 respectively are slidably guided on the guide rail 7 in the manner shown in FIGS. 3 and 4. For this purpose, the cross-section of the guide rail 7 is generally of U-shape and possesses, in the upper regions of its two arms, inwardly open guide channels opposite to each other for guiding the threaded cable 13, used for actuating the lid 3. In the guide channel not used in each case by a threaded cable 13, the sliding elements 5 and 6 are guided by guide projections 14, adapted to the channel cross-section.

The flexible threaded cables 13 are displaced in their guide channels by a drive pinion 15, engaging into their thread turns, of a gear apparatus 17, mounted on the front transverse portion of the guide frame 8 and actuated by a hand crank 16, for causing the adjustment movements of the lid 3. The rear sliding elements 6 are in engagement, by guide pins 18 fixed to them, with guide blocks 19 mounted laterally on the lid 3, as can be seen from FIGS. 4 and 6. This guide block engagement controls both the sliding movement and also the raising-out and pivoting-in movement of the lid 3. Since this invention does not concern this aspect of the automobile roof, the movement drive for the lid 3 is not further described.

On the side of the guide rail 7 remote from the water drainage channel 12, there is a further, laterally open, back-cut guide channel 20, which serves for guiding a sliding liner 21. In FIG. 2, this sliding liner 21, which may be equipped with ventilation openings or slits or the like, is illustrated in its closed position by full lines.

The sliding liner 21 is a stiff plate, rounded at its corners. At the two sides of the sliding liner 21, a total of four lugs 22, spaced apart, is releasably fixed to the upper face of the liner, which lugs engage with their outwardly pointing ends into the guide channel 20 adjacent to each and are firmly connected there to roller-shaped sliding pieces 23, which are slidably introduced in the guide channel 20. The lugs 22 are equipped, in the edge region of the sliding liner 21, with elongate holes 24, through which fixing screws 25 adjustably engage, by which the sliding pieces 23 are attached, adjustable in the direction of sliding, to the sliding liner 21.

On the two rear sliding pieces and coaxial with them, the active cable ends of a drive cable 26 for each are fixed, by injection moulding, tamping or cold forming. The drive cables 26 are guided displaceably in the guide channels 20 and in two guide tubes 27 and 28 (FIGS. 1, 2). The guide tubes 27 and 28 are each connected to one guide channel 20 and are bent towards each other through transition radii in such a manner that they run parallel to each other behind the guide frame 8. Their parallel position is secured by connecting lugs 29 (FIG. 2). On the free ends of the guide tubes 27 and 28, lengths of tubing 30, 31 respectively are fitted on, into which the passive ends of the drive cables 26 run during the opening displacement of the sliding liner 21.

The drive cables 26 are constructed as flexible threaded cables guided in a compression-stiff manner and constitute the actuating elements or movement transmission elements for the sliding liner 21. A pinion 32 engages into the turns of their threads, which pinion forms the gear output side of an electric motor 33, connected to a reduction gear and capable of being operated in either rotational direction. The electric motor 33 and its gear connected to it are fixed to the transverse member 10 and thus behind the sliding liner 21 when the latter is slid completely open. The guide tubes 27 and 28 of course possess, in their mutually parallel zone, appropriate cut-outs for engagement with the pinion 32 and are at a distance apart which facilitates engagement of the pinion 32 with the thread turns of the drive cable 26 through the openings in the tubes.

To actuate the electric motor 33, an actuating switch (not shown) is advantageously disposed within the immediate reach of the driver. After the switch has been actuated in the desired direction of displacement, the sliding liner 21 moves in either the opening direction or the closure direction, completely independently of the position of the rigid lid 3, it being possible for the sliding liner 21 to be moved steplessly into any intermediate position.

The present automobile roof may be constructed also without a drive apparatus, in accordance with the embodiment shown in FIG. 6. For this purpose, a flexible hand-operating device is provided, mounted at the centre of the front edge of the sliding liner 21, which device, in the example shown, consists of a simple band or of a cord 34, carrying at its outer end an actuating ring 35. The cord 34 and actuating ring 35 extend, even when the sliding liner 21 is slid fully open, into the opening in the fixed vehicle roof liner 36, so that the flexible hand-operating device can be gripped for the closure movement. The sliding liner 21 can, therefore, lie in its maximum open displacement, with its front edge behind the rear edge of the opening of the fixed roof liner 36.

The opening in the fixed roof liner 36 is bounded by a peripheral closure profile 37, which is pushed both onto the edge of the fixed roof liner 36 and also, at front and sides, onto a fixing flange 38 of the guide frame 8. At the rear edge, the closure profile 37 is pushed onto a transverse plate 39, which is disposed between the two lateral arms of the guide frame 8. Beneath the rear edge gap between the rigid lid 3 and the fixed roof portion 1, there is a water conducting plate 40, displaceable together with the rigid lid 3 beneath the rear roof portion, this guide plate serving for conducting away into the lateral water channels 12 water that has penetrated through the rear edge gap.

We claim:

1. An automobile roof comprising:
   a fixed roof portion defining a roof opening;
   a fixed vehicle liner beneath said roof opening, said liner itself having an opening;
   a rigid lid for said roof which in the closed position closes said roof opening and which may be partly displaced by displacement means for said opening;
   displacement means for moving said rigid lid within said opening;
   a sliding liner which is displaceable below a rear portion of said fixed roof portion, said sliding liner closing the opening in the fixed vehicle liner when in a closed position;
   said sliding liner having a front edge which in an open position lies above a rear edge of the opening of the fixed liner; drive apparatus connected with said sliding liner to move said sliding liner independently of the movement of said rigid lid; said drive apparatus including movement transmission elements which are connected to said sliding liner; lateral guide rails comprising a generally U-shaped configuration having inner and outer side walls joined by a lower web, opposed guide channels within said U-shaped configuration respectively carrying sliding elements and cable elements of said displacement means for guidance of said rigid lid, a back cut guide channel on an outer surface of said inner side wall; and a sliding piece connecting said sliding liner and one of said movement transmission elements, said sliding piece engaging within said back cut guide channel.

2. An automobile roof according to clam 1 wherein said rails are connected to each other in one piece.

* * * * *